US008630007B2

(12) United States Patent
Doui

(10) Patent No.: US 8,630,007 B2
(45) Date of Patent: Jan. 14, 2014

(54) IMAGE FORMING APPARATUS, METHOD FOR MANAGING PRINT JOB, AND COMPUTER-READABLE STORAGE MEDIUM FOR COMPUTER PROGRAM

(75) Inventor: Takayuki Doui, Kawanishi (JP)

(73) Assignee: Konica Minolta Business Technologies, Inc., Chiyoda-Ku, Tokyo (JP)

(*) Notice: Subject to any disclaimer, the term of this patent is extended or adjusted under 35 U.S.C. 154(b) by 56 days.

(21) Appl. No.: 13/041,663

(22) Filed: Mar. 7, 2011

(65) Prior Publication Data

US 2011/0222103 A1 Sep. 15, 2011

(30) Foreign Application Priority Data

Mar. 15, 2010 (JP) ................................ 2010-056999

(51) Int. Cl.
*G06F 3/12* (2006.01)
*G06K 15/00* (2006.01)

(52) U.S. Cl.
USPC ....... 358/1.15; 358/1.13; 358/1.14; 358/1.16; 713/155; 713/170

(58) Field of Classification Search
USPC ........................................................ 358/1.15
See application file for complete search history.

(56) References Cited

U.S. PATENT DOCUMENTS

| | | | | |
|---|---|---|---|---|
| 7,298,505 | B2 * | 11/2007 | Ueda | 358/1.14 |
| 2005/0033994 | A1 | 2/2005 | Suzuki | |
| 2005/0055547 | A1 * | 3/2005 | Kawamura | 713/155 |
| 2005/0273852 | A1 | 12/2005 | Ferlitsch | |
| 2007/0022467 | A1 | 1/2007 | Filbrich | |
| 2007/0177185 | A1 * | 8/2007 | Ogura et al. | 358/1.14 |
| 2008/0304101 | A1 * | 12/2008 | Sasase | 358/1.15 |
| 2010/0123932 | A1 * | 5/2010 | Nakamura | 358/1.15 |

FOREIGN PATENT DOCUMENTS

| | | |
|---|---|---|
| EP | 2 116 931 A1 | 11/2009 |
| JP | 2005-085090 | 3/2005 |
| JP | 2007-286984 | 11/2007 |
| JP | 2008-087270 A | 4/2008 |

(Continued)

OTHER PUBLICATIONS

Decision to Grant a Patent issued by the Japanese Patent Office on Dec. 6, 2011 in corresponding Japanese Patent Application Publication No. 2010-056999 and English-language translation.

(Continued)

*Primary Examiner* — Huo Long Chen
(74) *Attorney, Agent, or Firm* — Buchanan Ingersoll & Rooney PC

(57) ABSTRACT

An image forming apparatus is configured to access a storage that stores, therein, first associating information indicating a first terminal identifier for identifying a terminal and a first user identifier for identifying a user. The apparatus receives data based on which a print job is to be executed and which contains a second terminal identifier. If the second terminal identifier contained in the data matches the first terminal identifier indicated in the first associating information, then the apparatus executes the print job. Otherwise, the apparatus suspends execution of the print job. The apparatus receives an input of a second user identifier. If the second user identifier matches the first user identifier indicated in the first associating information, and, if the print job whose execution is suspended is selected, then the apparatus stores, into the storage, second associating information indicating the second terminal identifier and the second user identifier.

12 Claims, 16 Drawing Sheets

(56) References Cited

FOREIGN PATENT DOCUMENTS

| | | |
|---|---|---|
| JP | 2009-043271 | 2/2009 |
| JP | 2009-137200 | 6/2009 |
| JP | 2009-157531 A | 7/2009 |

OTHER PUBLICATIONS

European Search Report dated Oct. 31, 2011, issued in the corresponding European Patent Application No. 11157144.4-2212.

* cited by examiner

| CARD NUMBER (3211) | MAC ADDRESS (3212) |
|---|---|
| 10000001 | MAC78 |
| 10000002 | MAC02 |
| 10000003 | – |
| ⋮ | ⋮ |
| 10200002 | – |
| 10200003 | – |
| ⋮ | ⋮ |
| 45670012 | MAC85 |
| 45670015 | – |

IMAGE FORMING APPARATUS, METHOD FOR MANAGING PRINT JOB, AND COMPUTER-READABLE STORAGE MEDIUM FOR COMPUTER PROGRAM

This application is based on Japanese patent application No. 2010-056999 filed on Mar. 15, 2010, the contents of which are hereby incorporated by reference.

BACKGROUND OF THE INVENTION

1. Field of the Invention

The present invention relates to user authentication performed in an image forming apparatus.

2. Description of the Related Art

Some Multi-Function Peripherals (MFP's) installed in offices, and the like are configured to allow only a specific user to use a variety of functions equipped therein.

For example, such an MFP reads out authentication information from an Integrated Circuit (IC) card held over an IC card reader equipped in the MFP, and allows a holder of the IC card to use the MFP only when the authentication is successful. In another example, only when authentication information contained in a print job received by such an MFP is verified, the MFP executes the print job.

In the meantime, with an arrangement in which authentication information is incorporated into a print job, it is preferable that the authentication information be stored into a user terminal beforehand.

However, storing authentication information into a user terminal beforehand places a burden on a system administrator if the number of user terminals is large.

Further, cases have recently been seen in which a server manages resources such as application software and files, and a user uses a so-called thin client equipped only with the minimum functions such as a display function and an input function instead of using a terminal only for that user. In particular, a user may change thin clients to be used for operation on a daily basis in a non-territorial office with a desk-sharing scheme.

In such a case, it is almost impossible for a system administrator to store authentication information beforehand into each user terminal.

In the case where authentication information is not stored into a user terminal in advance, and where a user sends a print job, he/she needs to enter his/her authentication information by means of a keypad of a user terminal used by him/her. Alternatively, the user needs to hold his/her IC card over an IC card reader equipped in the user terminal to let the IC card reader read out authentication information from the IC card.

It is, however, troublesome for a user to enter his/her authentication information through a keypad for each printing process. Complicated authentication information may cause a user to input the authentication information incorrectly. A configuration is possible in which authentication information is set every time a user changes user terminals from one to another. In the case where, however, a user often changes user terminals, making settings in each case is troublesome. Complicated authentication information may lead to a settings error. In addition, providing an IC card reader or the like in each user terminal is unreasonable in terms of cost.

In the meantime, a technique has been proposed in which an MFP executes only a print job transmitted from an authentic terminal, i.e., a terminal registered in a management server (see Japanese Laid-open Patent Publication No. 2009-157531). A user terminal can be registered in the management server only when a user enters his/her user name and password and the entered user name and password are verified.

This technique eliminates the need to store authentication information into a user terminal beforehand, and also eliminates the need for a user to enter authentication information by means of a keypad.

The technique, however, requires a user to enter his/her user name and password for verification, and to register a user terminal in the management server every time the user changes user terminals from one to another. Thus, it is troublesome for a user who often changes user terminals to perform such registration operation every time he/she changes.

SUMMARY

The present disclosure is directed to solve the problems pointed out above, and therefore, an object of an embodiment of the present invention is to easily register a user terminal to an MFP without procedure only for registering the user terminal.

According to an aspect of the present invention, an image forming apparatus includes a storage that stores, therein, a plurality of pieces of first associating information each of which indicates a first terminal identifier for identifying a terminal and a first user identifier for identifying a user, a receiving portion that receives print job data based on which a print job is to be executed, the print job data containing a second terminal identifier, a permission portion that, if the second terminal identifier contained in the print job data matches the first terminal identifier indicated in any one of the plurality of pieces of first associating information, allows the print job to be executed based on the print job data, and otherwise, suspends execution of the print job based on the print job data, a user identifier input portion that receives an input of a second user identifier, and a registration portion that, if the second user identifier matches the first user identifier indicated in any one of the plurality of pieces of first associating information, and, if the print job whose execution is suspended is selected, stores, into the storage, second associating information as one of the plurality of pieces of first associating information, the second associating information indicating, as the first terminal identifier, the second terminal identifier contained in the print job data of said print job, and further indicating the second user identifier as the first user identifier.

These and other characteristics and objects of the present invention will become more apparent by the following descriptions of preferred embodiments with reference to drawings.

BRIEF DESCRIPTION OF THE DRAWINGS

FIG. 4 is a diagram illustrating an example of the structure and details of user information.

DESCRIPTION OF THE PREFERRED EMBODIMENTS

Figure 1:
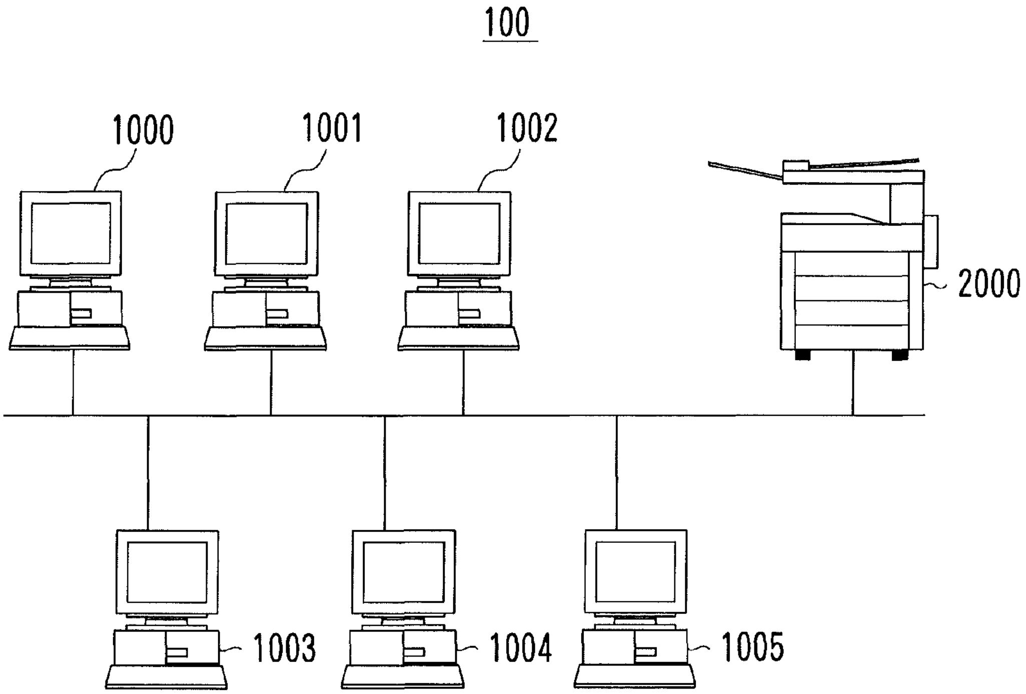
FIG. 1 is a diagram illustrating an example of the overall configuration of a printing system.

An MFP receives a print job from a terminal and executes the print job. The MFP also performs a process for authentication based on the received print job. To be specific, the MFP receives the print job by receiving print job data. The MFP executes the print job or performs the process for authentication based on the print job data. Hereinafter, the term "print job" means a print process in some cases, while the "print job" means data for a print process in other cases.

Under an environment where a user often changes user terminals to be used from one to another, it is convenient to incorporate, as authentication information, information for identifying a user terminal, e.g., a Media Access Control (MAC) address or an IP address (hereinafter, such information is referred to as a "terminal identifier") into a print job. This is because, when a terminal identifier is incorporated as authentication information, registering a user name, an employee ID, or the like in advance is unnecessary, and further, a user is not requested to enter authentication information by means of a keypad for each printing process. Note, however, that terminal identifiers of all the user terminals installed in an office need to be registered in an MFP beforehand.

Using a terminal identifier as authentication information provides an advantage in that any user terminal installed in an office is used to transmit a print job to an MFP for printing. On the other hand, printing is possible regardless of who has operated a user terminal, which may cause a problem in terms of security.

To cope with this, an MFP according to this embodiment is configured to, only when a terminal identifier contained in a print job is a terminal identifier of a terminal used by a user authorized to use the MPF, verify the terminal identifier.

The terminal identifier of the terminal used by the user authorized to use the MFP is obtained when the user who has been allowed to log onto the MFP selects a print job. Such a user who has been allowed to log thereonto is hereinafter referred to as a "log-on user".

The MFP of this embodiment is configured to correlate a terminal identifier contained in the print job selected by the log-on user with the log-on user who has selected that print job, and to verify only a terminal identifier correlated with a log-on user.

Accordingly, a user performs this correlating process only when he/she changes user terminals to be used from one to another. The user does not have to perform particular operation for the correlating process. The user logs onto the MFP in the usual way, and selects a print job to be executed thereby. This is similar to a case where a transmitted print job is a secure print job. The secure print job is a print job based on which printing is started on condition that the user logs onto the MFP.

Such a correlation between a terminal identifier and a log-on user is cleared appropriately, which makes it possible to maintain the security. For example, when a user loses a right to use the MFP, a correlation with that user is cleared. In the case of a non-territorial office, such a correlation is cleared every morning, for example.

Descriptions are given below of a printing system 100 according to an embodiment of the present invention, with reference to drawings.

[Functions]

FIG. 1 is a diagram illustrating an example of the overall configuration of the printing system 100.

The printing system 100 is configured of user terminals 1000, 1001, 1002, 1003, 1004, and 1005, an MFP 2000, and so on. In the illustrated example, while the printing system 100 includes six user terminals and one MFP, at least one user terminal and at least one MFP may be included in the printing system 100.

Each of the user terminals 1000 through 1005 is a terminal such as a personal computer, is provided with interfaces such as a display and a keyboard, and is operable to transmit a print job to the MFP 2000.

The MFP 2000 is generally called a multifunction device, and is configured to integrate, thereinto, a variety of functions, such as copying, faxing, network printing, scanning, and a box function. The MFP 2000 executes a print job transmitted from the user terminal 1000 or the like.

Descriptions are provided below of the hardware configuration of the MFP 2000.

Figure 2:
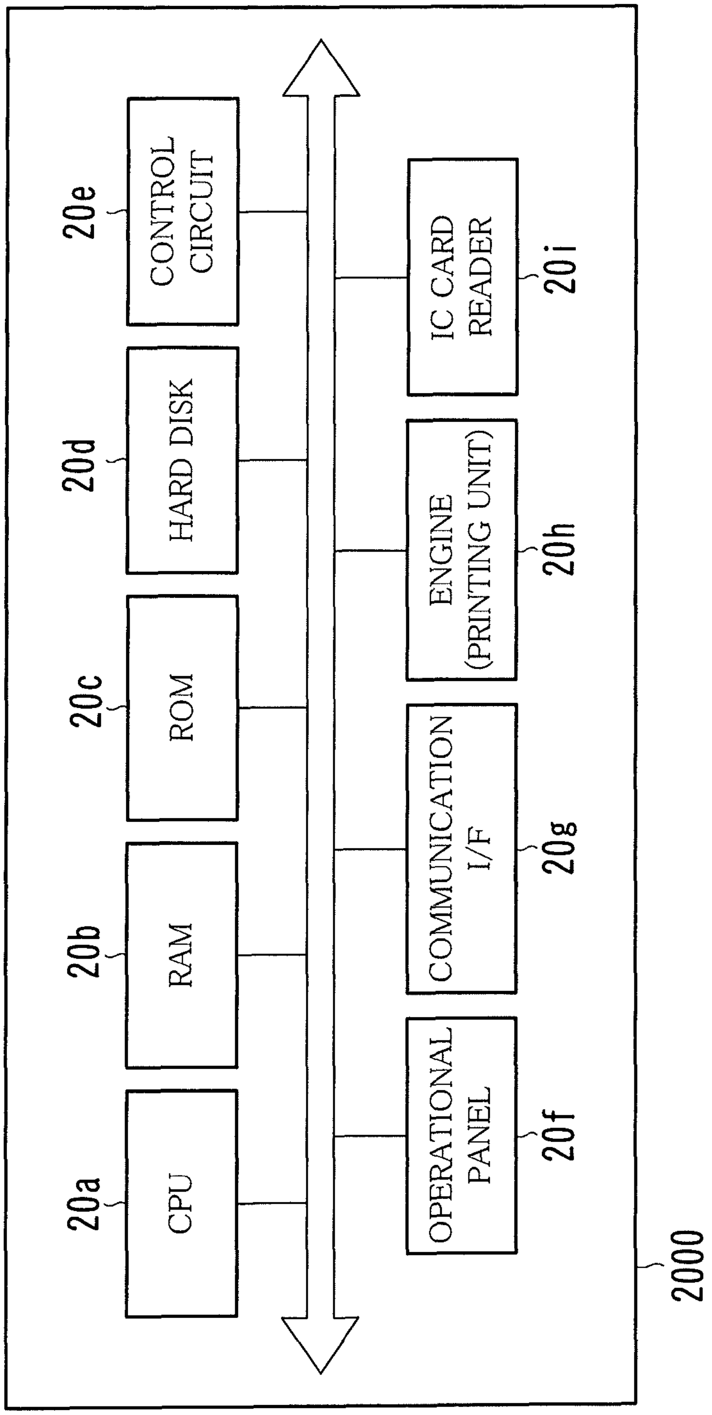
FIG. 2 is a diagram illustrating an example of the hardware configuration of an MFP.

FIG. 2 is a diagram illustrating an example of the hardware configuration of the MFP 2000.

The MFP 2000 is configured of a Central Processing Unit (CPU) 20*a*, a Random Access Memory (RAM) 20*b*, a Read-Only Memory (ROM) 20*c*, a hard disk 20*d*, a control circuit 20*e*, an operational panel 20*f*, a communication interface 20*g*, a printing unit 20*h*, an IC card reader 20*i*, and so on.

The control circuit 20*e* is a circuit for controlling the hard disk 20*d*, the operational panel 20*f*, the communication interface 20*g*, the printing unit 20*h*, the IC card reader 20*i*, and so on.

The operational panel 20*f* is a touch-screen display panel that displays, for example, a screen for giving a message or instructions to a user, a screen for the user to enter, for example, desired process type and desired process conditions, and a screen for displaying the result of a process executed by the CPU 20*a*. The user can give instructions, specify process conditions, or enter a password to the MFP 2000 by touching a predetermined position of the operational panel 20*f*. Thus, the operational panel 20*f* acts as an interface between the MFP 2000 and the user who operates the MFP 2000.

The communication interface 20*g* is a Network Interface Card (NIC) for communicating with another device such as the user terminal 1000 according to Transmission Control Protocol/Internet Protocol (TCP/IP) via a communication line, or a modem.

The printing unit 20*h* serves to print, onto paper, an image reproduced based on image data of a print job transmitted by the user terminal 1000, and the like.

The IC card reader 20*i* is an IC card reading device to read out data such as a card number from an IC card.

Descriptions are provided below, with reference to FIG. 3, of the user terminal 1000 and the MFP 2000, both of which constitute the printing system 100.

Figure 3:
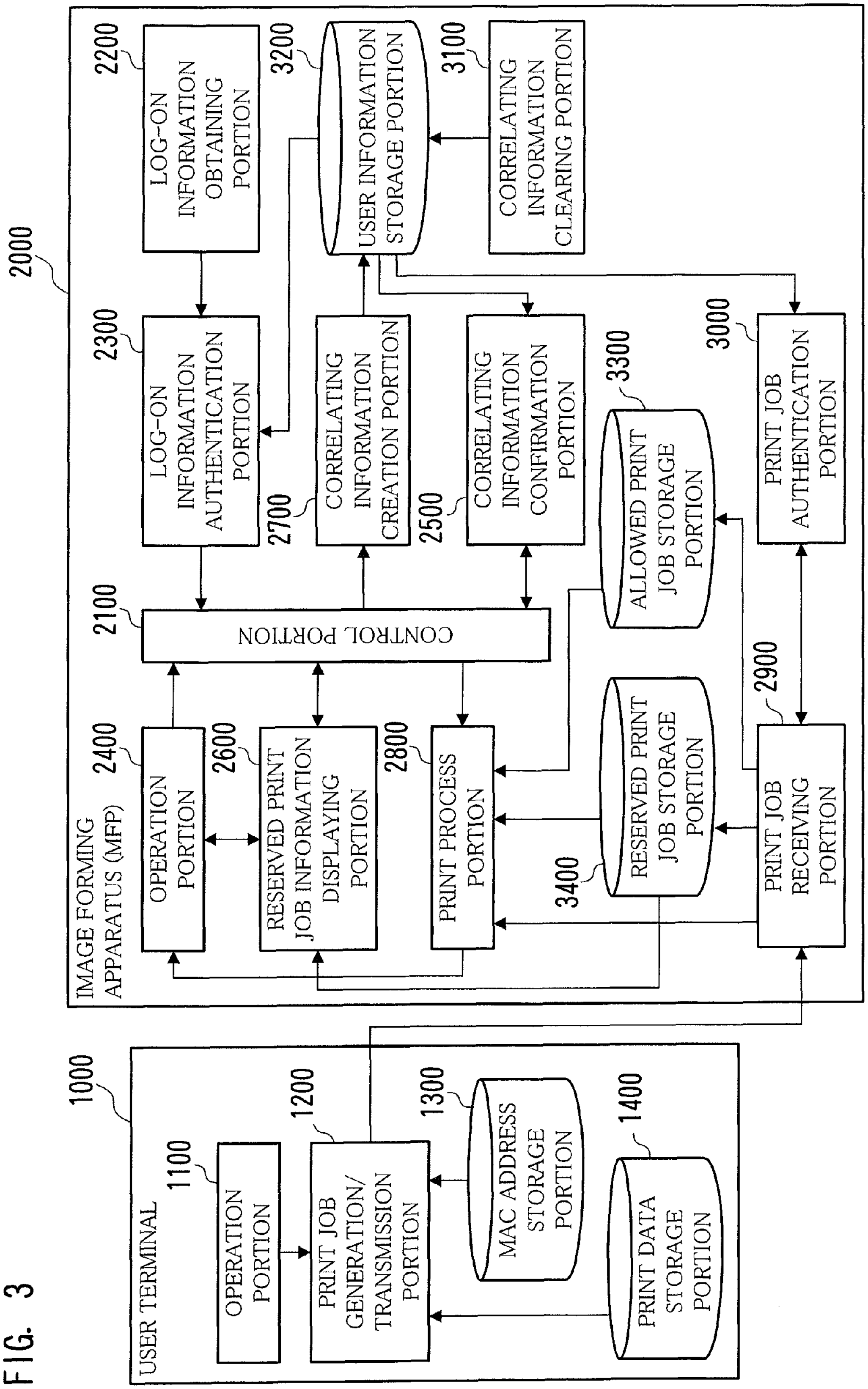
FIG. 3 is a block diagram illustrating an example of the functional configuration of a user terminal and an MFP.

FIG. 3 is a block diagram illustrating an example of the functional configuration of the user terminal 1000 and the MFP 2000.

In the present invention, the user terminals 1000 through 1005 (see FIG. 1) are provided with the same functions as one another. Accordingly, the user terminal 1000 is described herein as a representative example.

The user terminal 1000 includes an operation portion 1100, a print job generation/transmission portion 1200, a MAC address storage portion 1300, and a print data storage portion 1400.

A CPU of the user terminal 1000 executes programs stored in a memory of the user terminal 1000; thereby the whole or a part of functions of the individual portions of the user terminal 1000 are implemented as described below.

The operation portion 1100 is configured of a display, a keyboard, and so on, and is equipped with a function to receive instructions from a user and perform a process in accordance with the instructions. Here, the operation portion 1100 receives, from a user, print instructions in which a document or the like to be printed is specified, and instructs the print job generation/transmission portion 1200 to perform a necessary process.

The print job generation/transmission portion 1200 serves to generate a print job and transmit the print job to the MFP 2000 in accordance with the instructions from the operation portion 1100. In short, the print job generation/transmission portion 1200 is a so-called printer driver.

The print job generation/transmission portion 1200 reads out, from the print data storage portion 1400, print data of the document specified by the user or the like, and creates a print job including the print data thus read out and a MAC address read out from the MAC address storage portion 1300.

The MAC address storage portion 1300 stores, therein, a MAC address that is an identifier of the subject user terminal 1000.

The print data storage portion 1400 stores print data of a document or the like therein.

The MFP 2000 is configured of a control portion 2100, a log-on information obtaining portion 2200, a log-on information authentication portion 2300, an operation portion 2400, a correlating information confirmation portion 2500, a reserved print job information displaying portion 2600, a correlating information creation portion 2700, a print process portion 2800, a print job receiving portion 2900, a print job authentication portion 3000, a correlating information clearing portion 3100, a user information storage portion 3200, an allowed print job storage portion 3300, a reserved print job storage portion 3400, and the like.

The CPU 20*a* executes programs stored in a memory such as the hard disk 20*d* of the MFP 2000; thereby the whole or a part of functions of the individual portions of the MFP 2000 are implemented as described below.

The control portion 2100 performs ordinary control processing necessary for the MFP 2000, and controls a process unique to the present invention, e.g., a process for prompting a log-on user to select a reserved print job.

The log-on information obtaining portion 2200 is provided with the IC card reader 20*i*. The log-on information obtaining portion 2200 serves to read out a card number from an IC card held over the IC card reader 20*i* by the user, and to convey the card number thus read out to the log-on information authentication portion 2300. It is assumed that the card number is a user identifier in the present embodiment.

The log-on information authentication portion 2300 serves to perform authentication on the card number received from the log-on information obtaining portion 2200. The log-on information authentication portion 2300 refers to user information stored in the user information storage portion 3200 to perform authentication on the card number. If the card number is registered in the user information, then the log-on information authentication portion 2300 determines that the authentication is successful. In contrast, if the card number is not registered in the user information, then the log-on information authentication portion 2300 determines that the authentication fails. The log-on information authentication portion 2300 informs the control portion 2100 of the card number only when the authentication is successful.

The operation portion 2400 is provided with the operational panel 20*f*. The operation portion 2400 serves to display, on the operational panel 20*f*, a display screen in accordance with operation performed by a user, and to obtain instructions from the user.

The correlating information confirmation portion 2500 is operable to confirm whether or not the card number of the log-on user is correlated with any one of the user terminals.

The reserved print job information displaying portion 2600 creates a list of print jobs stored in the reserved print job storage portion 3400, and displays the list on the operational panel 20*f* through the operation portion 2400.

The correlating information creation portion 2700 creates correlating information in which a card number is correlated with a terminal identifier.

The print process portion 2800 is operable to execute a print job stored in the reserved print job storage portion 3400 or the allowed print job storage portion 3300 in accordance with instructions from the control portion 2100. To be specific, the print process portion 2800 prints, onto paper, an image reproduced based on print data contained in a print job.

The print job receiving portion 2900 receives a print job transmitted by the print job generation/transmission portion 1200 of the user terminal 1000, and stores the print job into the reserved print job storage portion 3400 or the allowed print job storage portion 3300. Which of the storage portions the print job is to be stored into is determined by inquiring of the print job authentication portion 3000 as to whether or not the print job is correlated with any of log-on users. If the print job is correlated with any of log-on users, then the print job receiving portion 2900 stores the print job into the allowed print job storage portion 3300. Otherwise, the print job receiving portion 2900 stores the print job into the reserved print job storage portion 3400.

The print job authentication portion 3000 determines whether or not the user terminal 1000 that has transmitted the print job is registered in the MFP 2000, i.e., whether or not a correlation with any of log-on users has been made.

The determination by the print job authentication portion 3000 is made by referring to user information stored in the user information storage portion 3200. If a terminal identifier contained in the print job is registered in the user information, then the print job authentication portion 3000 determines that the user terminal 1000 that has transmitted the print job is registered in the MFP 2000. Otherwise, the print job authentication portion 3000 determines that the user terminal 1000 that has transmitted the print job is not registered in the MFP 2000.

The correlating information clearing portion 3100 is operable to clear correlating information in accordance with settings made by an administrator. To be specific, the correlating information clearing portion 3100 clears, in accordance with the settings, a terminal identifier of correlating information in which the terminal identifier is correlated with a log-on user.

The user information storage portion 3200 serves to store information on users therein. The user information will be detailed below in the [Data] section.

The allowed print job storage portion 3300 stores, therein, a print job transmitted from a user terminal registered in the MFP 2000.

The reserved print job storage portion 3400 stores, therein, a print job transmitted from a user terminal that is not registered in the MFP 2000.

[Data]

Figure 5:
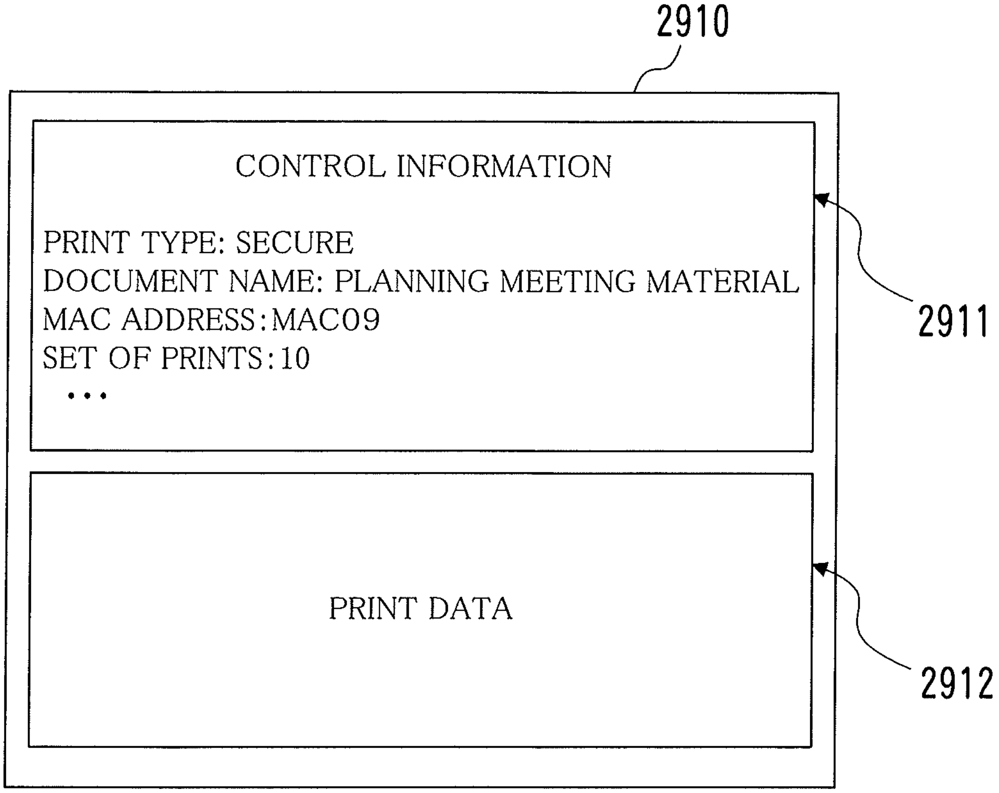
FIG. 5 is a diagram illustrating an example of the structure and details of a print job.

The following is a description of primary data used in the printing system 100 of this embodiment, with reference to FIGS. 4 and 5.

FIG. 4 is a diagram illustrating an example of the structure and details of user information 3210.

The user information 3210 is stored in the user information storage portion 3200 at the start of operation of the printing system 100.

The user information 3210 includes a card number 3211 and a MAC address 3212. The user information 3210 contains information about all the users who are permitted to use the MFP 2000. One record having such a structure is registered for one user.

The card number 3211 indicates the number of a card possessed by a user who is allowed to use the MFP 2000, and serves as a user identifier.

The MAC address 3212 serves as an identifier of a user terminal used by a user identified by the card number 3211. If a record indicates "-" as the MAC address 3212, then it means that a user identified by a card number indicated in the card number 3211 of the record does not use a user terminal.

FIG. 5 is a diagram illustrating an example of the structure and details of a print job 2910.

The print job 2910 includes control information 2911 and print data 2912.

The control information 2911 contains information about a print type, a document name, a MAC address, the set of prints, and the like.

In the case where "secure" is set as the print type, the corresponding print job 2910 is a job based on which printing is not to be started until a user gives a print command through the operational panel 20*f* of the MFP 2000. In the case where "non-secure" is set as the print type, the corresponding print job 2910 is a job based on which printing is to be started upon receipt of the corresponding print job 2910.

The document name is an identifier of the print job 2910 for a user.

The MAC address is an identifier of a user terminal that has transmitted the print job 2910.

The set of prints is the number of prints of a document based on the print data 2912.

The print data 2912 is data of, for example, a document to be printed, and is provided in a format such as Printer Control Language (PCL) or Post Script (PS).

[Indication on Display]

Descriptions are given below of main indications on a display used in the printing system 100 of this embodiment, with reference to FIGS. 6 and 7. The indications on a display described herein are examples of indications made on the operational panel 20*f* of the MFP 2000.

Figure 6:
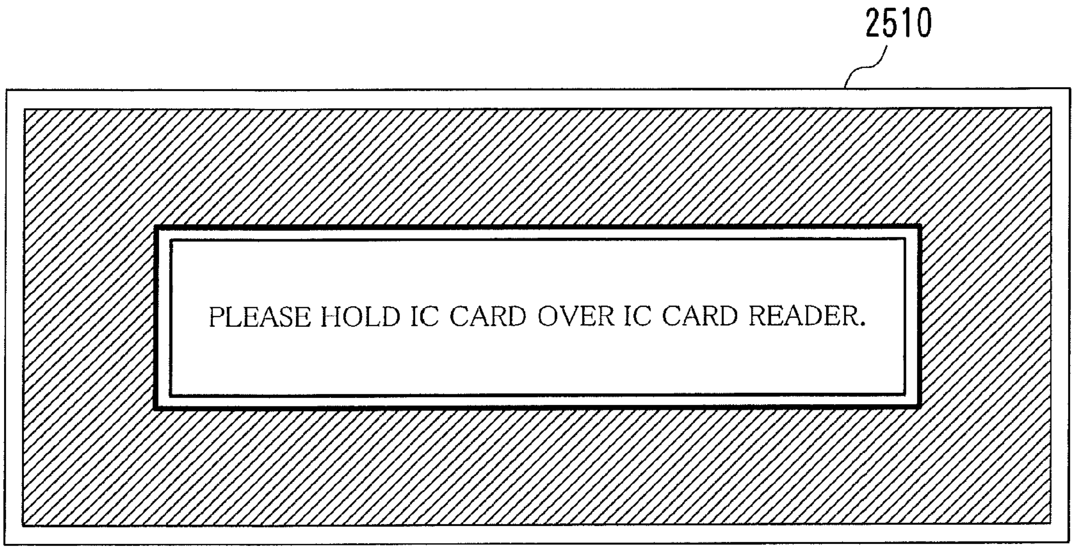
FIG. 6 is a diagram illustrating an example of an initial screen.

FIG. 6 is a diagram illustrating an example of an initial screen 2510.

The initial screen 2510 is to prompt a user to hold an IC card over the IC card reader 20*i*. The user holds his/her IC card over the IC card reader 20*i*; thereby to log onto the MFP 2000.

Figure 7:
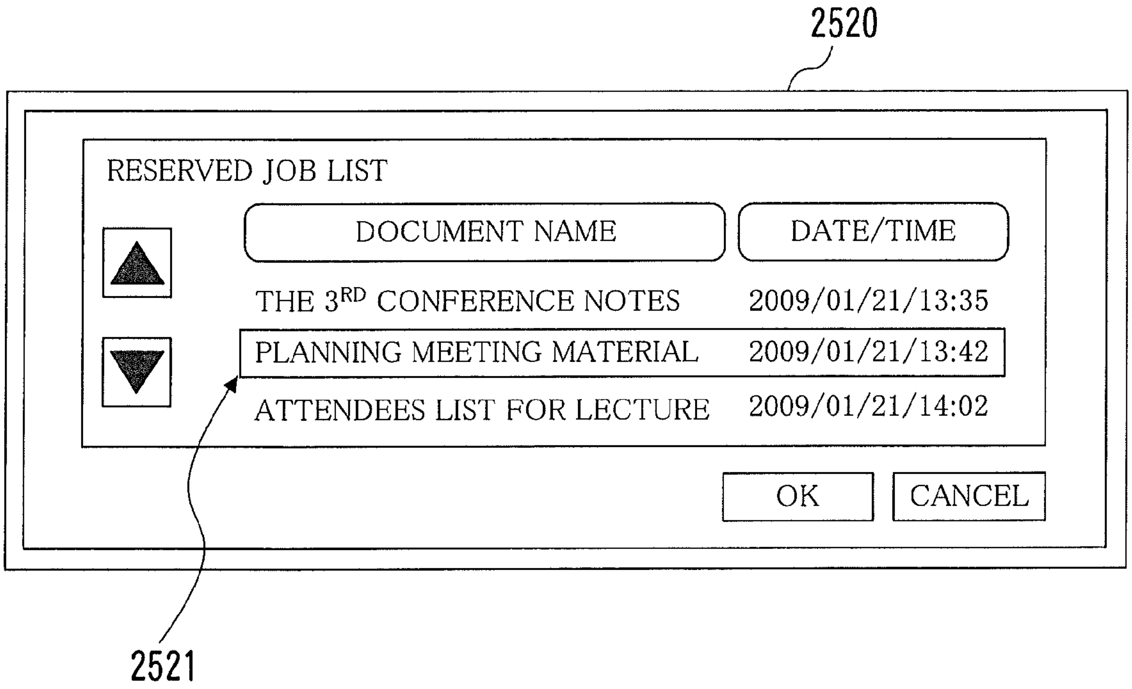
FIG. 7 is a diagram illustrating an example of a reserved job list screen.

FIG. 7 is a diagram illustrating an example of a reserved job list screen 2520.

The reserved job list screen 2520 displays a list of reserved print jobs 2910, i.e., print jobs 2910 in which a MAC address of the control information 2911 is not registered in the user information 3210. A user moves a cursor 2521 to select a print job that has been transmitted by a user terminal in accordance with his/her command. In the illustrated example, a print job 2910 having a document name of "planning meeting material" is selected by moving the cursor 2521. If the user presses an "OK" button, then a user terminal that has transmitted the selected print job 2910 is registered in the user information 3210, and a print process based on the selected print job is performed.

[Operation]

Descriptions are provided below of operation performed in the printing system 100 of this embodiment, with reference to FIGS. 8-10.

The following three processes are described herein.

The first one is a process for a case where the MFP 2000 receives a print job 2910. The second one is a process for correlating a user with the user terminal 1000. The third one is a process for clearing correlating information that is performed at the time specified by a system administrator.

[Print Job Reception Process]

Figure 8:
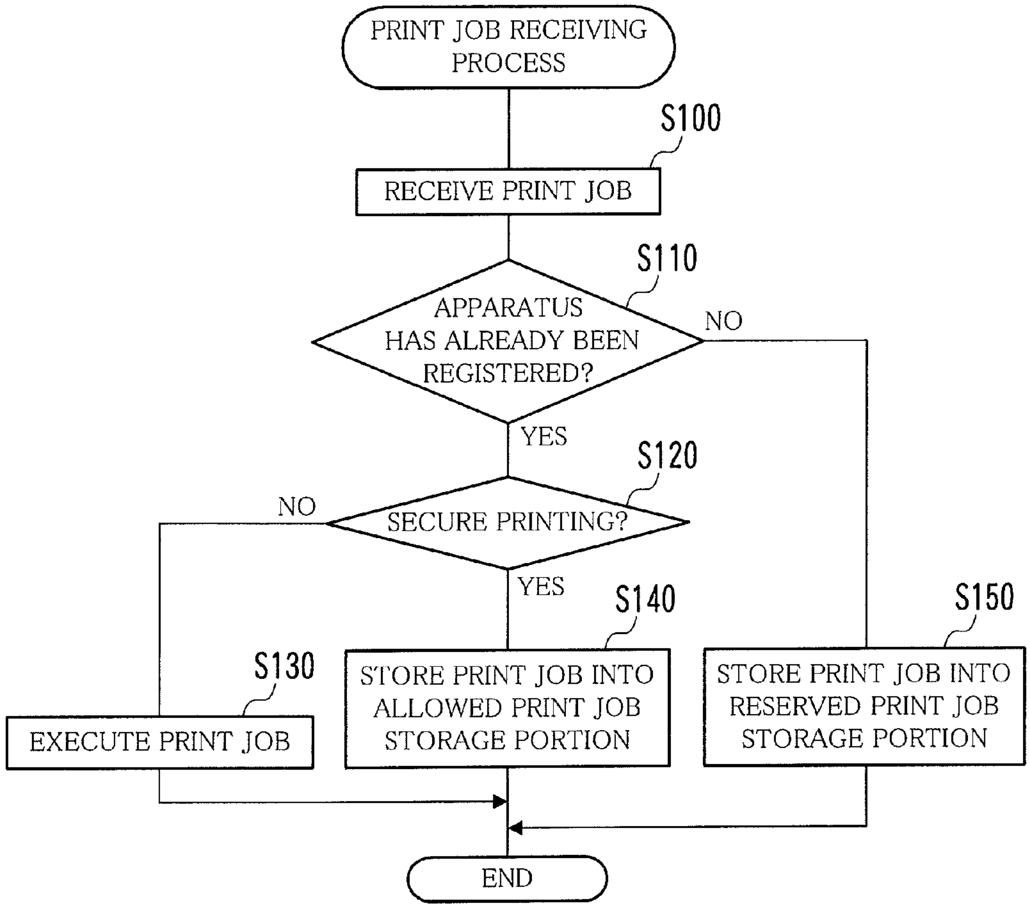
FIG. 8 is a flowchart depicting an example of a process for a case where an MFP receives a print job.

FIG. 8 is a flowchart illustrating an example of a process for a case where the MFP 2000 receives a print job 2910 from the user terminal 1000.

A user of the user terminal 1000 specifies a document and gives a print command.

The operation portion 1100 detects the print command operation, notifies the print job generation/transmission portion 1200 of the specified document, and instructs the same to create a print job and send the print job.

In accordance with the instructions, the print job generation/transmission portion 1200 creates a print job 2910 (see FIG. 5) based on which the specified document is to be printed, and transmits the print job 2910 to the MFP 2000. To be specific, the print job generation/transmission portion 1200 reads out data of the specified document from the print data storage portion 1400, and creates print data 2912. The print job generation/transmission portion 1200 also reads out a MAC address from the MAC address storage portion 1300, and creates control information 2911 together with other information.

The print job receiving portion 2900 of the MFP 2000 receives the print job 2910 (Step S100) and makes an inquiry to the print job authentication portion 3000 whether or not the print job 2910 is registered in the MFP 2000. At this time, the print job receiving portion 2900 conveys, to the print job authentication portion 3000, the MAC address specified in the control information 2911 of the print job 2910.

Upon receiving the inquiry, the print job authentication portion 3000 determines whether or not the received MAC address is registered in the MFP 2000.

To be specific, the print job authentication portion 3000 searches in the user information 3210 for a record having the received MAC address specified as the MAC address 3212.

If such a record is found out by the search, then the print job authentication portion 3000 determines that the received MAC address is registered in the MFP 2000. Otherwise, the print job authentication portion 3000 determines that the received MAC address is not registered in the MFP 2000. The print job authentication portion 3000 informs the print job receiving portion 2900 of the determination result (Step S110).

If the print job receiving portion 2900 receives the determination result indicating that the MAC address is not registered in the MFP 2000 (Step S110: No), then the print job receiving portion 2900 stores the print job 2910 into the reserved print job storage portion 3400 (Step S150).

On the other hand, if the print job receiving portion 2900 receives the determination result indicating that the MAC address is registered in the MFP 2000 (Step S110: Yes), and if the print type indicated in the control information 2911 of the print job 2910 is "secure", then the print job receiving portion 2900 stores the print job 2910 into the allowed print job storage portion 3300 (Step S140).

Further, if the print job receiving portion 2900 receives the determination result indicating that the MAC address is registered in the MFP 2000, and if the print type indicated in the control information 2911 of the print job 2910 is "non-secure", then the print job receiving portion 2900 stores the print job 2910 into the allowed print job storage portion 3300, and requests the print process portion 2800 to execute the print job 2910. Responding to the request, the print process portion 2800 executes the print job 2910 (Step S130).

[Correlating Process]

Figure 9:
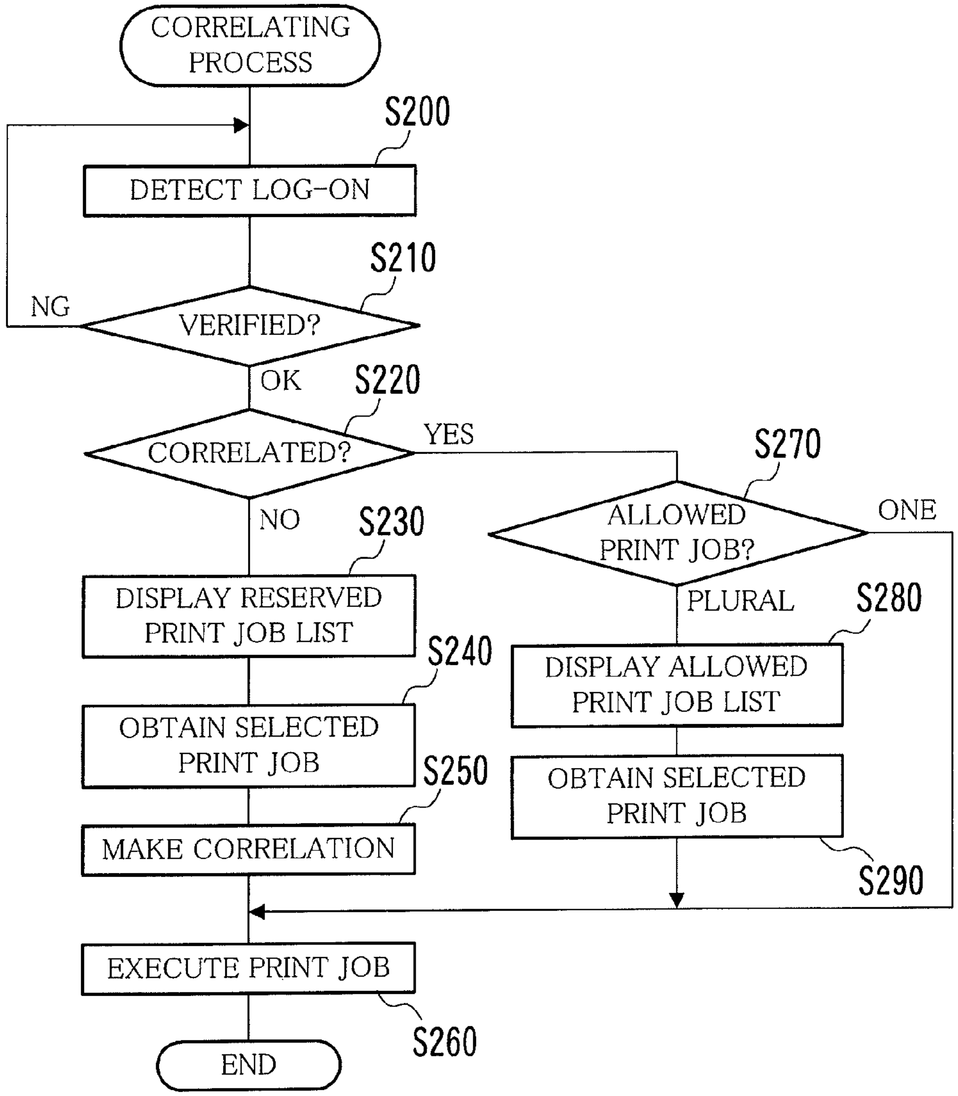
FIG. 9 is a flowchart depicting an example of a correlating process.

FIG. 9 is a flowchart illustrating an example of a correlating process for registering the user terminal 1000 of a user to the MFP 2000 at the same time when the MFP 2000 executes a print job 2910 transmitted in accordance with a command of the user.

After operating the user terminal 1000 to transmit the print job 2910, the user comes to the location of the MFP 2000 to obtain a printed matter.

The user confirms that the initial screen 2510 (see FIG. 6) is displayed on the operational panel 20*f* of the MFP 2000, and holds his/her IC card over the IC card reader 20*i*.

The log-on information obtaining portion 2200 of the MFP 2000 obtains a card number from the IC card (Step S200), and sends the card number to the log-on information authentication portion 2300.

When receiving the card number, the log-on information authentication portion 2300 performs authentication on the card number. To be specific, the log-on information authentication portion 2300 searches, in the user information 3210 stored in the user information storage portion 3200, for a record having the received card number specified as the card number 3211.

If such a record is found out by the search, it means that the card number is verified. In contrast, if such a record is not found out, it means that the card number is not verified.

If the card number is not verified (Step S210: NG), then the log-on information authentication portion 2300 performs nothing, and waits for a request from the log-on information obtaining portion 2200.

If the card number is verified (Step S210: OK), then the log-on information authentication portion 2300 sends the card number to the control portion 2100.

When receiving the card number, the control portion 2100 requests the correlating information confirmation portion 2500 to confirm whether or not the user terminal 1000 used by the user identified by the card number is registered, or, in other words, whether or not the user terminal 1000 is correlated with the card number.

Responding to the request, the correlating information confirmation portion 2500 searches in the user information 3210 for a record having the card number specified as the card number 3211. The correlating information confirmation portion 2500, then, confirms whether a MAC address is specified in the MAC address 3212 of the record found out by the search, or, in other words, confirms that "-" is not specified in the MAC address 3212.

If a MAC address is specified in the MAC address 3212, then the correlating information confirmation portion 2500 determines that the correlation has been made. If "-" is specified therein, then the correlating information confirmation portion 2500 determines that the correlation has not been made. The correlating information confirmation portion 2500, then, conveys the determination result to the control portion 2100. In the case of the former determination result, the correlating information confirmation portion 2500 conveys the MAC address specified as the MAC address 3212 together with the determination result to the control portion 2100.

If the control portion 2100 receives the determination result indicating that the correlation has not been made (Step S220: No), then the control portion 2100 requests the reserved print job information displaying portion 2600 to display a list of reserved print jobs.

Upon receiving the request, the reserved print job information displaying portion 2600 creates a list of print jobs 2910 stored in the reserved print job storage portion 3400, and displays the list on the operational panel 20*f* through the operation portion 2400 (Step S230, see the reserved job list screen 2520 of FIG. 7).

After seeing the reserved job list screen 2520 displayed on the operational panel 20*f*, the user moves the cursor 2521 to the print job 2910 that has been transmitted in accordance with his/her command, and presses the "OK" button.

The operation portion 2400 informs the reserved print job information displaying portion 2600 of the position of the cursor 2521.

Subsequently, the reserved print job information displaying portion 2600 obtains information indicating the selected print job 2910 based on the reserved job list screen 2520 and the position of the cursor 2521, and sends the obtained information to the control portion 2100 (Step S240).

The control portion 2100 receives the information indicating the selected print job 2910, and sends, to the correlating information creation portion 2700, a MAC address specified in the control information 2911 of the print job 2910 indicated in the information and the card number received from the log-on information authentication portion 2300. Thereby, the control portion 2100 requests the correlating information creation portion 2700 to correlate the MAC address with the card number.

Upon receiving the request, the correlating information creation portion 2700 searches in the user information 3210 for a record having the received card number specified as the card number 3211. The correlating information creation portion 2700, then, specifies the MAC address received from the control portion 2100 as the MAC address 3212 of the record found out by the search (Step S250).

After sending the request to the correlating information creation portion 2700, the control portion 2100 sends, to the print process portion 2800, the information indicating the print job 2910 received from the reserved print job information displaying portion 2600; thereby to request the print process portion 2800 to perform printing.

Upon receiving the request, the print process portion 2800 executes the print job 2910 indicated in the information (Step S260).

On the other hand, if the control portion 2100 receives, from the correlating information confirmation portion 2500, the determination result indicating that the correlation has been made (Step S220: Yes), then the control portion 2100 sends, to the print process portion 2800, the MAC address received from the correlating information confirmation portion 2500, and requests the print process portion 2800 to execute the print job 2910.

Upon receiving the request, the print process portion 2800 selects, from among print jobs 2910 stored in the allowed print job storage portion 3300, a print job 2910 having the received MAC address specified in the control information 2911 (Step S270: one job), and executes the selected print job 2910 (Step S260).

At this time, if the print process portion 2800 selects a plurality of print jobs 2910, then a list of the print jobs 2910 is created and displayed on the operational panel 20*f* through the operation portion 2400 (Step S280). The print job 2910 selected from the displayed list by the user is obtained (Step S290), and the selected print job 2910 is executed (Step S260). It is possible to execute all of the selected print jobs 2910. In such a case, the list of the selected print jobs 2910 may not be displayed.

[Correlating Information Clearing Process]

Figure 10:
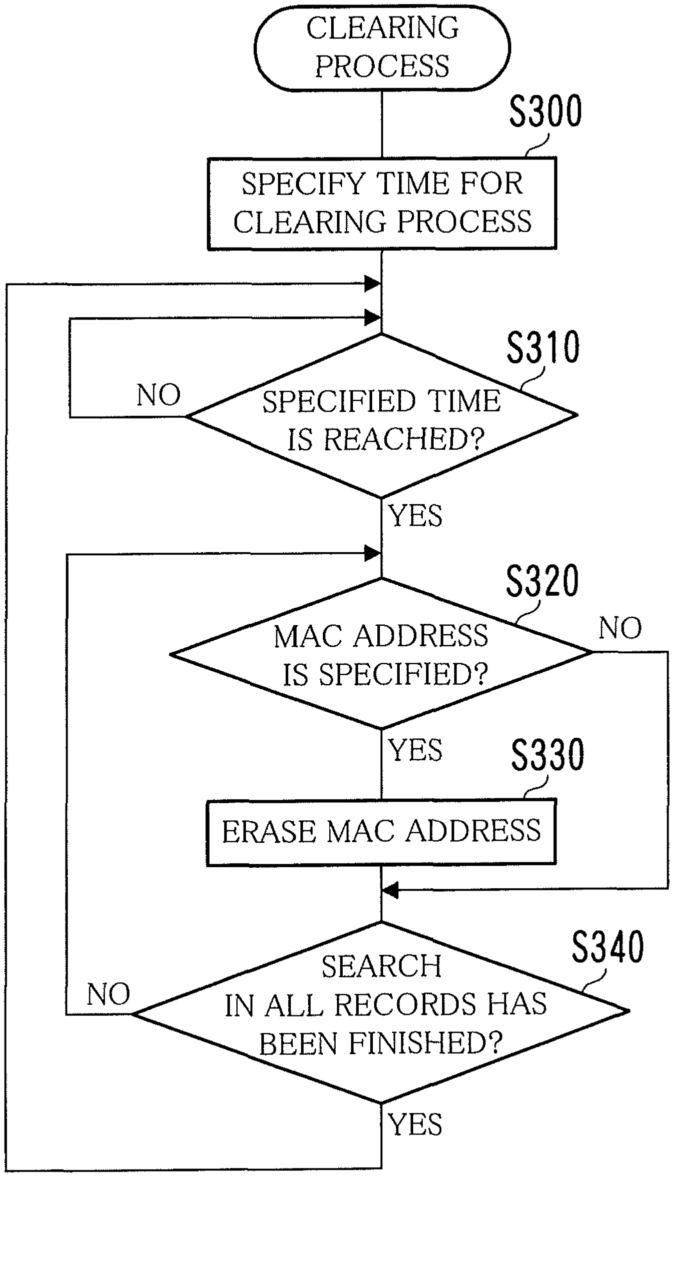
FIG. 10 is a flowchart depicting an example of a process for an MFP to clear correlating information.

FIG. 10 is a flowchart illustrating an example of a process for the MFP 2000 to clear correlating information.

First, a system administrator sets the time at which a process for clearing correlating information is started. The system administrator specifies, for example, "6 o'clock every morning" as the time.

The control portion 2100 obtains the time specified by the system administrator through the operation portion 2400, and sets a timer in such a manner that the correlating information clearing portion 3100 is started at the specified time (Step S300).

When the specified time is reached, the correlating information clearing portion 3100 is started by the timer (Step S310: Yes). If a MAC address is specified in the MAC address 3212 of a record registered in the user information 3210 stored in the user information storage portion 3200 (Step S320: Yes), then the correlating information clearing portion 3100 sets "-" in the MAC address 3212 (Step S330). Otherwise (Step S320: No), the correlating information clearing portion 3100 performs nothing.

The correlating information clearing portion 3100 repeats the process of Step S320 and Step S330 until search in all the records registered in the user information 3210 is finished (Step S340: No).

If search in all the records registered in the user information 3210 is finished (Step S340: Yes), then the correlating information clearing portion 3100 finishes the process, and waits for being started at the next specified time (Step S310: No).

MODIFIED EXAMPLE

In the embodiment discussed above, a user who has been allowed to log onto the MFP 2000 is permitted to select any print jobs on the reserved job list screen 2520. The following is a description of the modified example in which entering a password is required to select a reserved print job; thereby to avoid a correlation with a user terminal used by another user.

According to the modified example, after correlating a card number of user's IC card with a MAC address of the user terminal 1000, the MFP 2000 informs the user terminal 1000 of the card number.

Thus, in the case where the user terminal 1000 does not receive the card number, the user terminal 1000 determines that a correlation has not yet been made. The user terminal 1000, then, requests a password from a user when he/she transmits a print job, incorporates the password obtained from the user into the print job, and transmits the print job to the MFP 2000.

The MFP 2000 is configured to request a log-on user to enter his/her password when he/she selects a reserved print job, and to perform a correlating process when the password thus entered matches a password contained in the reserved print job.

The configuration described above makes it possible to accurately correlate a card number of user's card with a MAC address of the user terminal 1000 of the user.

[Function]

Figure 11:
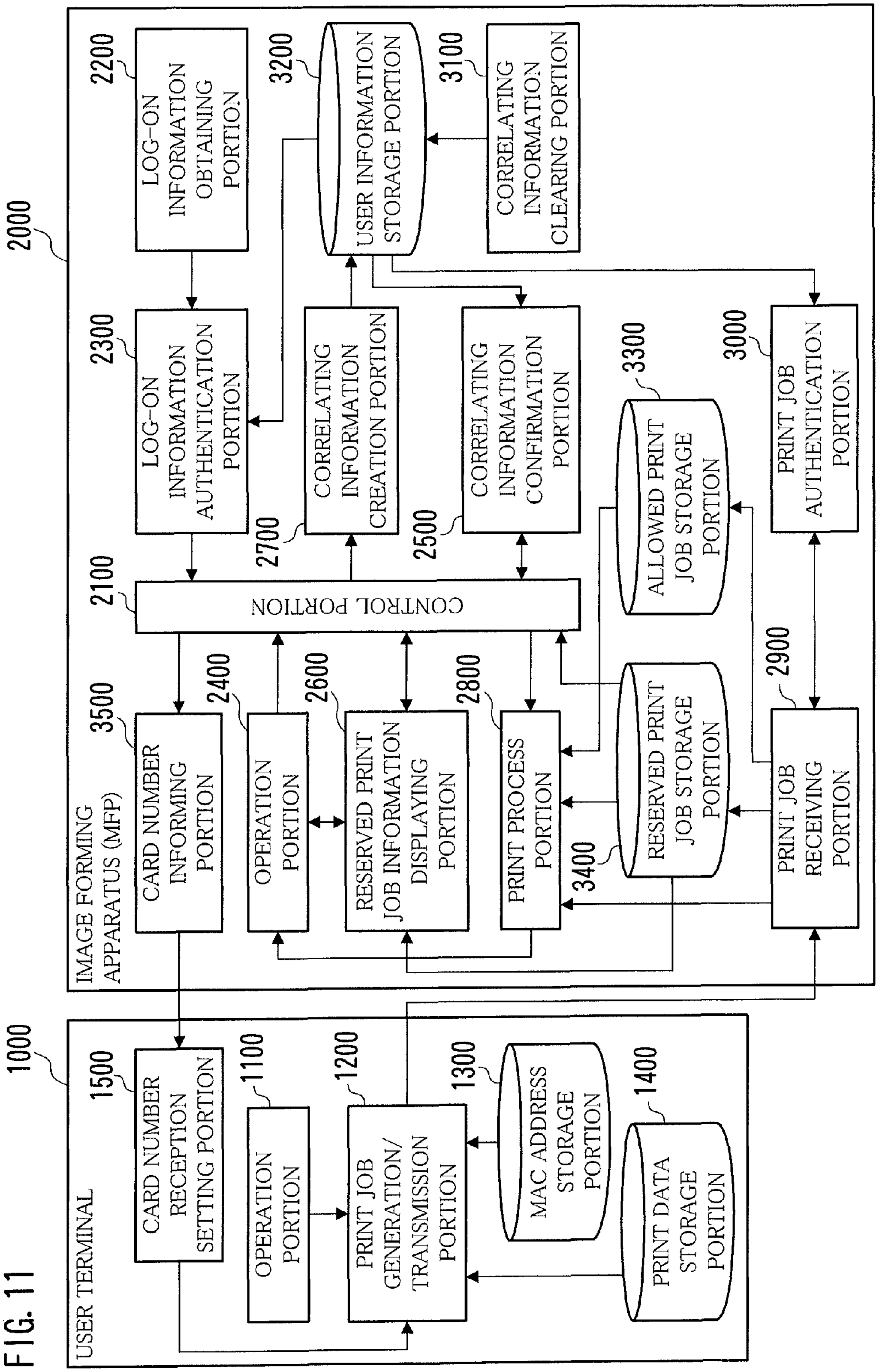
FIG. 11 is a block diagram illustrating a modified example of the functional configuration of a user terminal and an MFP.

FIG. 11 is a block diagram illustrating an example of the functional configuration of the user terminal 1000 and the MFP 2000. The block diagram is different from the block diagram of FIG. 3 in that a card number reception setting portion 1500 is added to the user terminal 1000, and a card number informing portion 3500 is added to the MFP 2000.

The card number informing portion 3500 serves to inform the user terminal 1000 of a card number. The card number reception setting portion 1500 serves to inform the print job generation/transmission portion 1200 of a card number received from the card number informing portion 3500.

[Data]

Figure 12:
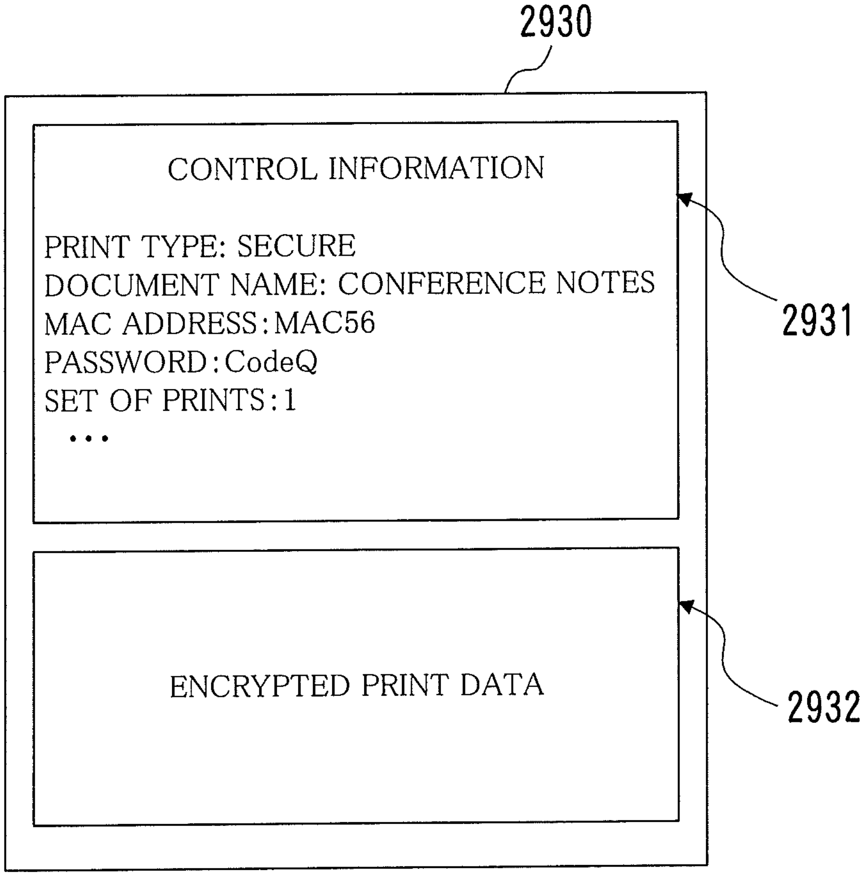
FIG. 12 is a diagram illustrating an example of the structure and details of a print job in which a password has been set.

FIG. 12 is a diagram illustrating an example of a print job 2930 in which a password has been set.

The print job 2930 includes control information 2931 and encrypted print data 2932. In this modified example, it is assumed that print data is encrypted by using a password entered by a user.

The control information 2931 indicates, for example, "Code Q" as a password.

Figure 13:
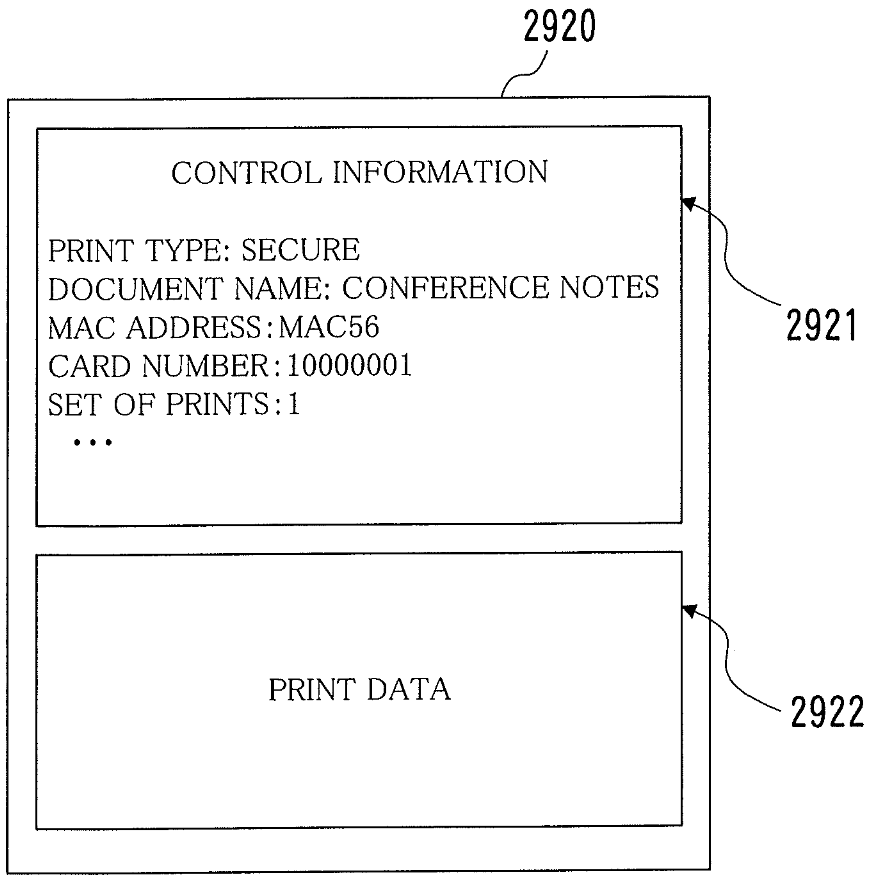
FIG. 13 is a diagram illustrating an example of the structure and details of a print job in which a card number has been set.

FIG. 13 is a diagram illustrating an example of a print job 2920 in which a card number has been set.

The print job 2920 includes control information 2921 and print data 2922. In this modified example, it is assumed that print data is not encrypted after a correlating process is performed.

The control information 2921 indicates, for example, "10000001" as a card number.

[Indication on Display]

Figure 14:
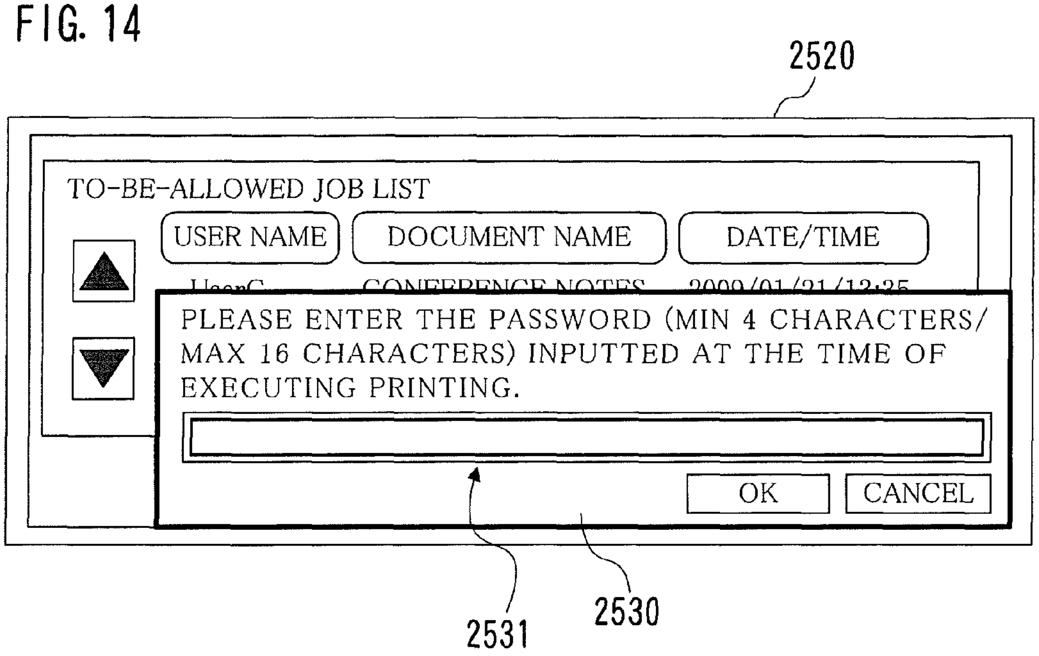
FIG. 14 is a diagram illustrating an example of a password request screen.

FIG. 14 is a diagram illustrating an example of a password request screen 2530.

When a user selects a print job by moving a cursor on the reserved job list screen 2520 displayed on the operational panel 20*f* of the MFP 2000, and presses the "OK" button, the password request screen 2530 is displayed.

The user enters his/her password in an input area 2531, and presses an "OK" button.

[Operation]

Descriptions are provided below of a process for transmitting a print job by the user terminal 1000, and a correlating process by the MFP 2000.

[Print Job Transmission Process]

Figure 15:
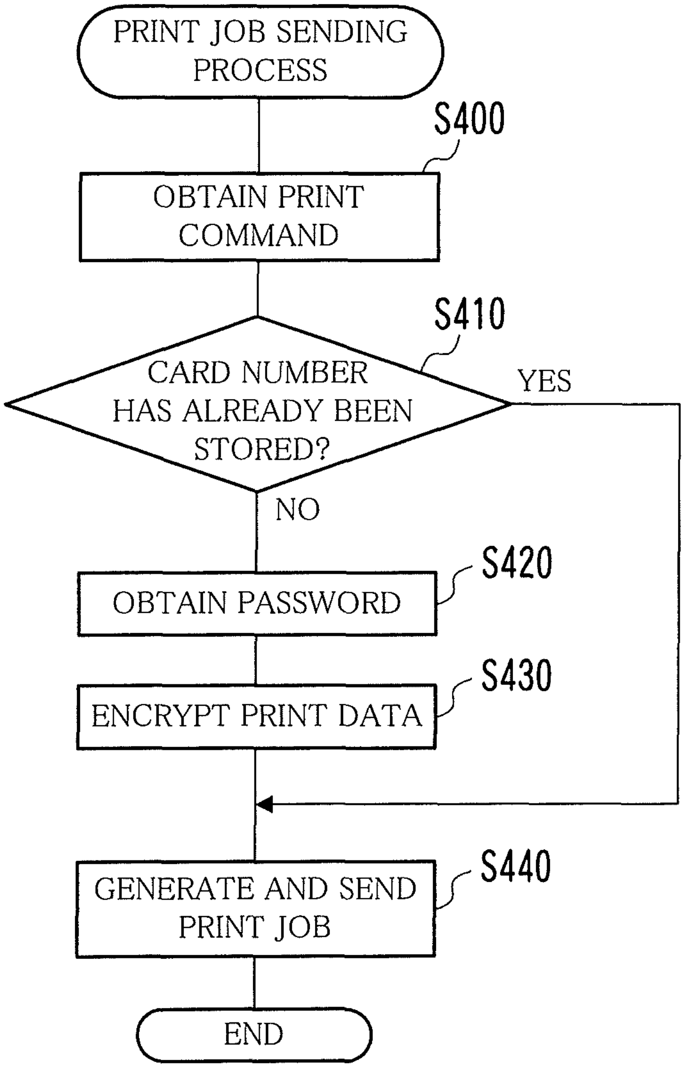
FIG. 15 is a flowchart depicting an example of a process for a user terminal to transmit a print job.

FIG. 15 is a flowchart illustrating an example of a process for the user terminal 1000 to transmit a print job.

A user of the user terminal 1000 specifies a document and gives a print command.

The operation portion 1100 detects the print command operation (Step S400), notifies the print job generation/transmission portion 1200 of the specified document, and instructs the same to create a print job and send the print job.

In accordance with the instructions, the print job generation/transmission portion 1200 confirms whether or not a card number has been sent from the MFP 2000. To be specific, the print job generation/transmission portion 1200 confirms whether or not a card number has been received from the card number reception setting portion 1500 and the card number has been stored into a memory.

If the card number has already been stored (Step S410: Yes), then the print job generation/transmission portion 1200 creates a print job 2920 (see FIG. 13) for printing the specified document, and sends the print job 2920 to the MFP 2000 (Step S440).

On the other hand, if the card number has not yet been stored (Step S410: No), then the print job generation/transmission portion 1200 requires the user to enter his/her password; thereby to obtain the password (Step S420).

Thereafter, the print job generation/transmission portion 1200 creates a print job 2930 (see FIG. 12), and sends the print job 2930 to the MFP 2000 (Step S440). To be specific, the print job generation/transmission portion 1200 uses the password to encrypt print data read out from the print data storage portion 1400 (Step S430); thereby to create encrypted print data 2932. The print job generation/transmission portion 1200 also generates control information 2931 based on the password, the MAC address read out from the MAC address storage portion 1300, and so on.

[Correlating Process]

Figure 16:
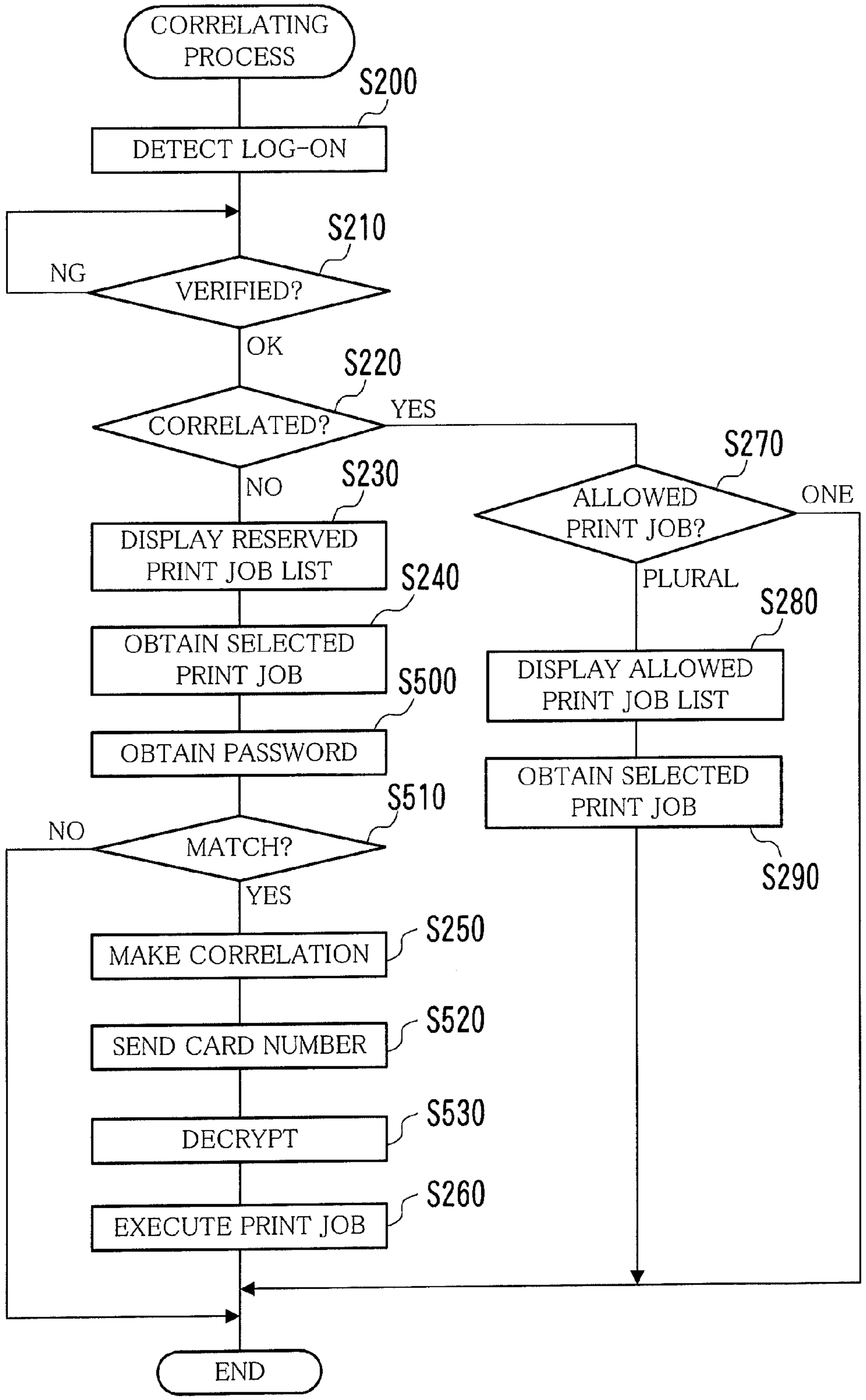
FIG. 16 is a flowchart depicting a modified example of a correlating process.

FIG. 16 is a flowchart depicting an example of a correlating process for registering the user terminal 1000 of a user to the MFP 2000 at the same time when the MFP 2000 executes a print job transmitted in accordance with a command of the user.

The flowchart of FIG. 16 corresponds to the flowchart depicting the correlating process according to the embodiment shown in FIG. 9 and additional processes of Step S500 to Step S530, i.e., a process for prompting a user to enter his/her password, and the like.

The following description, thus, focuses on the additional processes.

After seeing the reserved job list screen 2520 on the operational panel 20*f*, the user moves the cursor 2521 to a print job 2910 that has been transmitted in accordance with his/her command, and presses the "OK" button.

The operation portion 2400 informs the reserved print job information displaying portion 2600 of the position of the cursor 2521. Subsequently, the reserved print job information displaying portion 2600 obtains information indicating a selected print job 2930 based on the reserved job list screen 2520 and the cursor 2521.

The reserved print job information displaying portion 2600, then, displays the password request screen 2530 above the reserved job list screen 2520 (see FIG. 14).

In response to the password request screen 2530 displayed, the user uses the keypad to enter, into the input area 2531, the password that has been entered to transmit the print job 2930, and presses an "OK" button.

The operation portion 2400 sends the entered password to the reserved print job information displaying portion 2600 (Step S500). The reserved print job information displaying portion 2600 conveys, to the control portion 2100, the password and the information indicating the print job 2930 selected by the user.

Upon receiving the password and the information, the control portion 2100 reads out, from the reserved print job storage portion 3400, the print job 2930 indicated in the received information. Subsequently, the control portion 2100 determines whether or not the received password is identical to the password set in the control information 2931 (Step S510).

If both the passwords are different from each other, i.e., if the password entered by the user is incorrect (Step S510: No), then the control portion 2100 finishes the process.

On the other hand, if both the passwords are identical to each other, i.e., if the password entered by the user is correct (Step S510: Yes), then the control portion 2100 requests the correlating information creation portion 2700 to perform a correlating process, and the correlating information creation portion 2700 performs the correlating process in accordance with the request (Step S250).

After the correlating process is performed, the control portion 2100 asks the card number informing portion 3500 to transmit the correlated card number to the user terminal 1000 identified by the MAC address set in the control information 2931 of the print job 2930.

In accordance with the request, the card number informing portion 3500 transmits the card number to the user terminal 1000 (Step S520).

The card number reception setting portion 1500 of the user terminal 1000 receives the card number from the card number informing portion 3500 to inform the print job generation/transmission portion 1200 of the card number. Thereafter, the print job generation/transmission portion 1200 generates a print job 2920 in which the card number is set in the control information 2921.

After asking for the transmission of the card number, the control portion 2100 uses the password to decrypt the encrypted print data 2932 of the print job 2930. The control portion 2100, then, conveys the decrypted print data to the print process portion 2800, and requests the same to perform printing.

In accordance with the request, the print process portion 2800 executes the print job 2930 indicated in the received information (Step S260).

The image forming apparatus configured as described above can easily register a user terminal to an MFP without procedure only for registering the user terminal.

Although the embodiments of the present invention have been described above, the present invention is not limited thereto. The following arrangement is possible.

1) In the embodiments described above, a MAC address is used as a terminal identifier. Instead, however, other information such as an IP address may be used as a terminal identifier. Any other information is possible as long as it can identify a user terminal.

Further, a card number is used as a user identifier in the embodiments. Instead, however, other information such as a character string arbitrarily set by a user or biometric information like fingerprint may be used as a user identifier. Any other information is possible as long as it can identify a user.

2) According to the embodiments discussed above, correlations between card numbers and MAC addresses for all the users are cleared at the time specified by a system administrator. Instead, however, it is possible to make settings for clearing such correlations separately on a user-by-user basis. It is also possible to make settings for a period or the number of times for clearing such correlations. Further, a user may clear such a correlation by himself/herself.

Another configuration is possible in which the MFP 2000 periodically accesses each user terminal 1000, and erases, from the user information 3210, a MAC address of a user terminal 1000 from which no response is received due to being turned OFF, or the like.

3) The whole or a part of the individual elements of the printing system shown in, for example, FIG. 3 may be realized in the form of a one-chip integrated circuit or multi-chip integrated circuits.

4) The whole or a part of the individual elements in the printing system shown in, for example, FIG. 3 may be realized by a computer program, or may be implemented in any other formats.

In the case of a computer program, a computer is preferably caused to load the computer program written onto a recording medium such as a memory card or a CD-ROM, and to execute the computer program. Alternatively, a computer is preferably caused to download a computer program via a network and to execute the computer program.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image forming apparatus comprising:

an associating information storage that stores associating information which associates a terminal identifier for identifying a user terminal and a user identifier for identifying a user with each other;

a print job receiving portion that receives, from the user terminal, a print job data containing the terminal identifier of the user terminal;

an execution giving permission portion that gives permission to execute the print job when the terminal identifier contained in the received print job data is stored in the associating information storage, and suspends execution of the print job when the terminal identifier is not stored in the associating information storage;

a user identifier obtaining portion that requests the user to enter the user identifier and obtains the user identifier;

a suspended job obtaining portion that requests the user to select the print job whose execution is suspended by the execution permission giving portion and obtains the selected print job when the user identifier obtained by the user identifier obtaining portion is stored in the associating information storage portion;

an associating information generating portion that generates, as the associating information, information in which the terminal identifier contained in the print job obtained by the suspended job obtaining portion and the user identifier obtained by the user identifier obtaining portion are associated with each other, and stores the associating information in the associating information storage;

a determination portion that determines, when the execution giving permission portion gives the permission to execute the print job, whether the print job is a secure print job, the secure print job involving instruction from the user in order to initiate execution; and a job execution portion that executes the print job when: (i) the determination portion determines that the print job is not the secure print job, and (ii) the terminal identifier contained in the received print job data is stored in the associating information storage.

2. The image forming apparatus according to claim 1, wherein the associating information generating portion stores the terminal identifier contained in the print job obtained by the suspended job obtaining portion and the user identifier obtained by the user identifier obtaining portion, and then, executes the print job.

3. The image forming apparatus according to claim 1, further comprising a deletion portion that, before the user uses the terminal, deletes the terminal identifier stored in association with the user identifier of the user in the associating information storage.

4. The image forming apparatus according to claim 1, wherein the print job contains a first password, the suspended job obtaining portion requests the user to select the print job and to enter the first password, and obtains the selected print job and the entered password, when the first password contained in the print job matches the first password obtained by the suspended job obtaining portion, the associating information generating portion generates, as the associating information, information in which the terminal identifier contained in said print job and the user identifier obtained by the user identifier obtaining portion are associated with each other, and stores the associating information.

5. A print job management method used in an image forming apparatus including an associating information storage that stores associating information which associates a terminal identifier for identifying a user terminal and a user identifier for identifying a user with each other, the method comprising:

receiving, from the user terminal, a print job containing the terminal identifier of the user terminal;

giving a permission to execute the print job when the terminal identifier contained in the received print job data is stored in the associating information storage and suspending execution of the print job when the terminal identifier is not stored in the associating information storage;

requesting the user to enter the user identifier and obtaining the user identifier;

requesting the user to select the print job whose execution is suspended and obtaining the selected print job when the obtained user identifier is stored in the associating information storage;

generating, as the associating information, information in which the terminal identifier contained in the obtained print job and the obtained user identifier are associated with each other, and storing the associating information in the associating information storage;

when permission is given to execute the print job, determining whether the print job is a secure print job, the secure print job involving instruction from the user in order to initiate execution; and when the print job is determined to not be a secure print job and the terminal identifier contained in the received print job data is stored in the associating information storage, executing the print job.

6. The method according to claim 5, further comprising storing the terminal identifier contained in the obtained print job and the obtained user identifier, and then, executing the print job.

7. The method according to claim 5, further comprising, before the user uses the terminal, deleting the terminal identifier stored in association with the user identifier of the user in the associating information storage.

8. The method according to claim 5, wherein the print job contains a first password;

the method further comprises:

requesting the user to select the print job and to enter the first password, and obtaining the selected print job and the entered password; and generating, as the associating information, information in which the terminal identifier contained in the print job and the obtained user identifier are associated with each other and storing the associating information when the first password contained in the print job matches the entered password.

9. A non-transitory computer-readable storage medium storing thereon a computer program used for causing an image forming apparatus to manage a print job, the image forming apparatus including an associating information storage that stores associating information which associates a terminal identifier for identifying a user terminal and a user identifier for identifying a user with each other, the computer program comprising:

receiving, from the user terminal, a print job containing the terminal identifier of the user terminal;

giving a permission to execute the print job when the terminal identifier contained in the received print job is stored in the associating information storage, and suspending execution of the print job when the terminal identifier is not stored in the associating information storage;

requesting the user to enter the user identifier and obtaining the user identifier;

requesting the user to select the print job whose execution is suspended and obtaining the selected print job when the obtained user identifier is stored in the associating information storage;

generating, as the associating information, information in which the terminal identifier contained in the obtained print job and the obtained user identifier are associated with each other, and storing the associating information in the associating information storage;

when the permission is given to execute the print job, determining whether the print job is a secure print job, the secure print job involving instruction from the user in order to initiate execution; and when the print job is determined to not be a secure print job and the terminal identifier contained in the received print job data is stored in the associating information storage, executing the print job.

10. The non-transitory computer-readable storage medium according to claim 9, the computer program further comprising storing the terminal identifier contained in the obtained print job and the obtained user identifier, and then, executing the print job.

11. The non-transitory computer-readable storage medium according to claim 9, the computer program further comprises, before the user uses the terminal, deleting the terminal identifier stored in association with the user identifier of the user in the associating information storage.

12. The non-transitory computer-readable storage medium according to claim 9, wherein the print job contains a first password;

the computer program further comprises:

requesting the user to select the print job and to enter the first password, and obtaining the selected print job and the entered password; and generating, as the associating information, information in which the terminal identifier contained in the print job and the obtained user identifier are associated with each other and storing the associating information when the first password contained in the print job matches the entered password.

* * * * *